United States Patent [19]

Armstrong

[11] Patent Number: 4,570,777
[45] Date of Patent: Feb. 18, 1986

[54] TREADLE CONTROL

[75] Inventor: Donald R. Armstrong, Carmel, Ind.

[73] Assignee: Hugh J. Baker and Company, Indianapolis, Ind.

[21] Appl. No.: 539,340

[22] Filed: Oct. 5, 1983

[51] Int. Cl.⁴ .............................................. F16D 11/00
[52] U.S. Cl. ................................. 192/134; 192/131 R; 72/26
[58] Field of Search .......................... 72/1, 2, 26, 444; 192/130, 131 R, 134

[56] References Cited

U.S. PATENT DOCUMENTS

| | | | |
|---|---|---|---|
| 1,958,128 | 5/1934 | Cate ..................................... | 192/130 |
| 2,013,102 | 9/1935 | Ledbetter ......................... | 192/131 R |
| 2,616,542 | 11/1952 | Danly et al. ......................... | 72/1 X |
| 3,986,281 | 10/1976 | Darwin ............................. | 192/130 X |

Primary Examiner—Stephen F. Husar
Attorney, Agent, or Firm—Barnes & Thornburg

[57] ABSTRACT

A control for a treadle activated machine tool having a driving power and a mechanical treadle linkage connecting the treadle to the driving power. The control comprises at least one sensor for sensing the presence of an operator's hand remote from a work area of the machine tool and an interrupt for selectively interrupting the treadle linkage in response to a signal indicating the absence of the operator's hand from the sensor.

12 Claims, 4 Drawing Figures

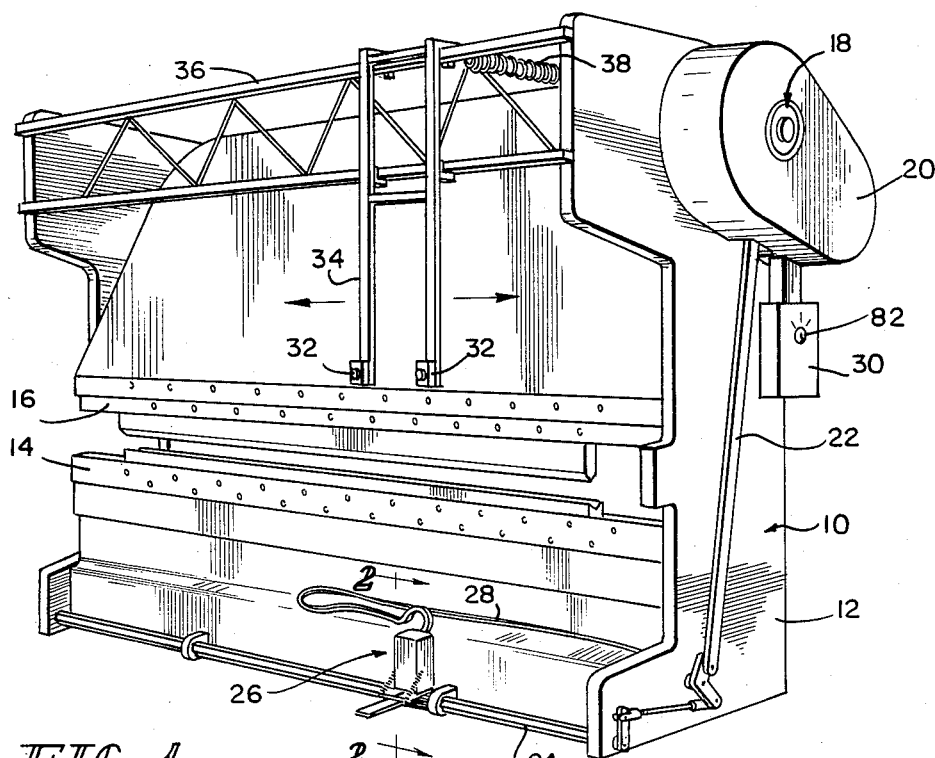
FIG. 1
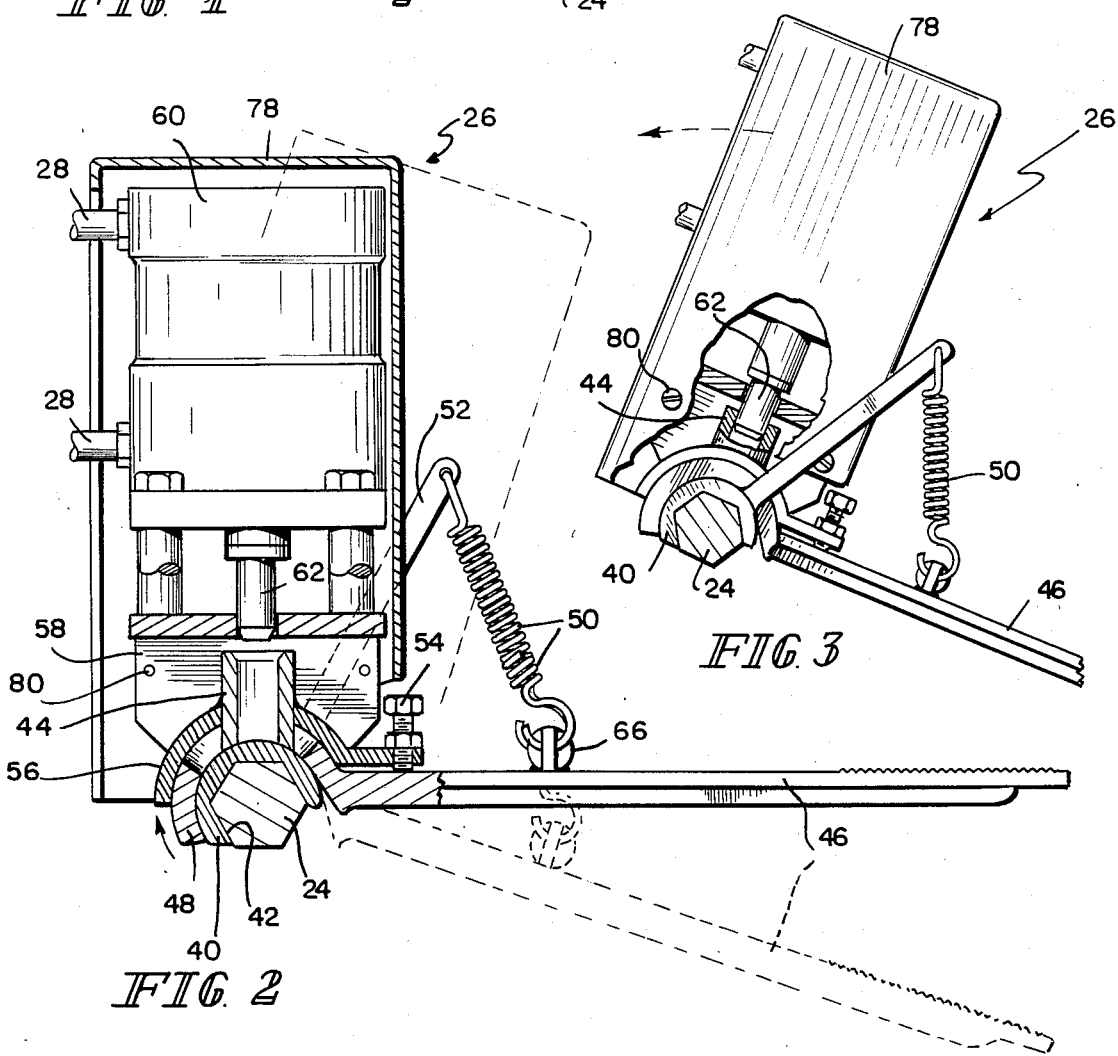
FIG. 2
FIG. 3

TREADLE CONTROL

The present invention relates generally to a control for a treadle actuated machine tool, and more specifically to a safety control mechanism for preventing the treadle operation of the machine tool in certain circumstances so as to lessen the likelihood of injury to an operator's hands during operation of the tool. The present invention can be employed on any treadle actuated powered apparatus intended to do some work to a workpiece to achieve a change in configuration of that workpiece such as a punch press, shear, or the like. The present invention has particular utility on a press brake.

Press brake assemblies for bending sheet metal, bars, or the like, are well known. A typical press brake includes a bed on which a workpiece is placed, and a moveable ram which is aligned for reciprocal movement above the bed. The reciprocal movement of the ram is typically caused by an eccentric mounted for rotation on a shaft with a clutch. A power driven flywheel is provided which can be engaged by the clutch to cause rotation of the shaft and eccentric to actuate the reciprocal motion of the ram. A brake is provided for stopping the rotation of the shaft and eccentric when the clutch is disengaged from the flywheel. The clutch is typically controlled by a treadle and a mechanical treadle linkage connecting the treadle to the clutch. The mechanical linkage often includes a treadle bar generally of non circular cross-section which extends substantially completely across the front of the press brake. The treadle is positionable by the operator to any convenient point along the treadle bar which will permit ease of operation of the press brake assembly.

To provide for operator safety, various safety control mechanisms have been proposed for use on conventional press brake assemblies. While some safety control mechanisms are easily included as original equipment, the adaptation of existing machine tools, including press brake assemblies, to include the safety control mechanisms is often difficult and expensive. An object of the present invention is to provide an inexpensive safety control mechanism which is easily adaptable to conventional treadle operated power machine tools, particularly press brake assemblies.

In accordance with the present invention, the control comprises at least one sensor means for sensing the presence of an operators hand, remote from a work area of the machine tool. The control means further comprises an interrupt means for selectively interrupting the treadle linkage in response to a signal from the sensor indicating the absence of the operator's hand from the sensor location. The present invention contemplates a first and a second member of the treadle linkage, the members being displaceable from a rest position, and an engaging means for engaging the first and second members to permit co-displacement of the members upon application of a force to the treadle. The engaging means is engageable only if the two members are undisplaced from their rest position, but is disengageable at any position by the interrupt means.

In a particularly advantageous embodiment, the control can be incorporated as a substitute treadle. The substitute treadle includes a first member engageable with the treadle bar and a second member including a foot pedal movable with respect to the first member from a position aligned with the first member to a displaced position upon application of a force to the foot pedal. A biasing means is provided for biasing the second member toward the aligned position and an engaging means is provided for selectively engaging the first and second members only if the second member is undisplaced from the aligned position. The engaging means is disengageable from the first member at any position in the event that an operator removes his hand from palm button or other similar sensor. Preferably a pair of sensors are provided spaced sufficiently far apart to prevent simultaneous actuation by one hand or arm of the operator. Further, a sensor selector means can be provided for selecting the number of sensors required to be actuated to block disengagement of the engaging means.

The preferred illustrated embodiment of the present invention can be used in connection with various palm buttons or sensors and the position of the sensors can be conveniently modified so as to permit ease of operation by the operator yet still retain the safety desired for the operator. The illustrated preferred embodiment has the added advantage of tools having treadle bars with little or no modification thereof.

Additional features and advantages of the invention will become apparent to those skilled in the art upon consideration of the following detailed description of a preferred embodiment exemplifying the best mode of carrying out the invention as presently preceived. The detailed description particularly refers the accompanying figures in which:

FIG. 1 is a perspective view of a press brake assembly having a treadle control in accordance with the present invention mounted thereon;

FIG. 2 is a sectional view taken along line 2—2 of FIG. 1 to show a treadle control in accordance with the present invention with the engaging means being disengaged.

FIG. 3 is a side elevation view partially broken away showing the engaging means in an engaged position.

Figure 4:
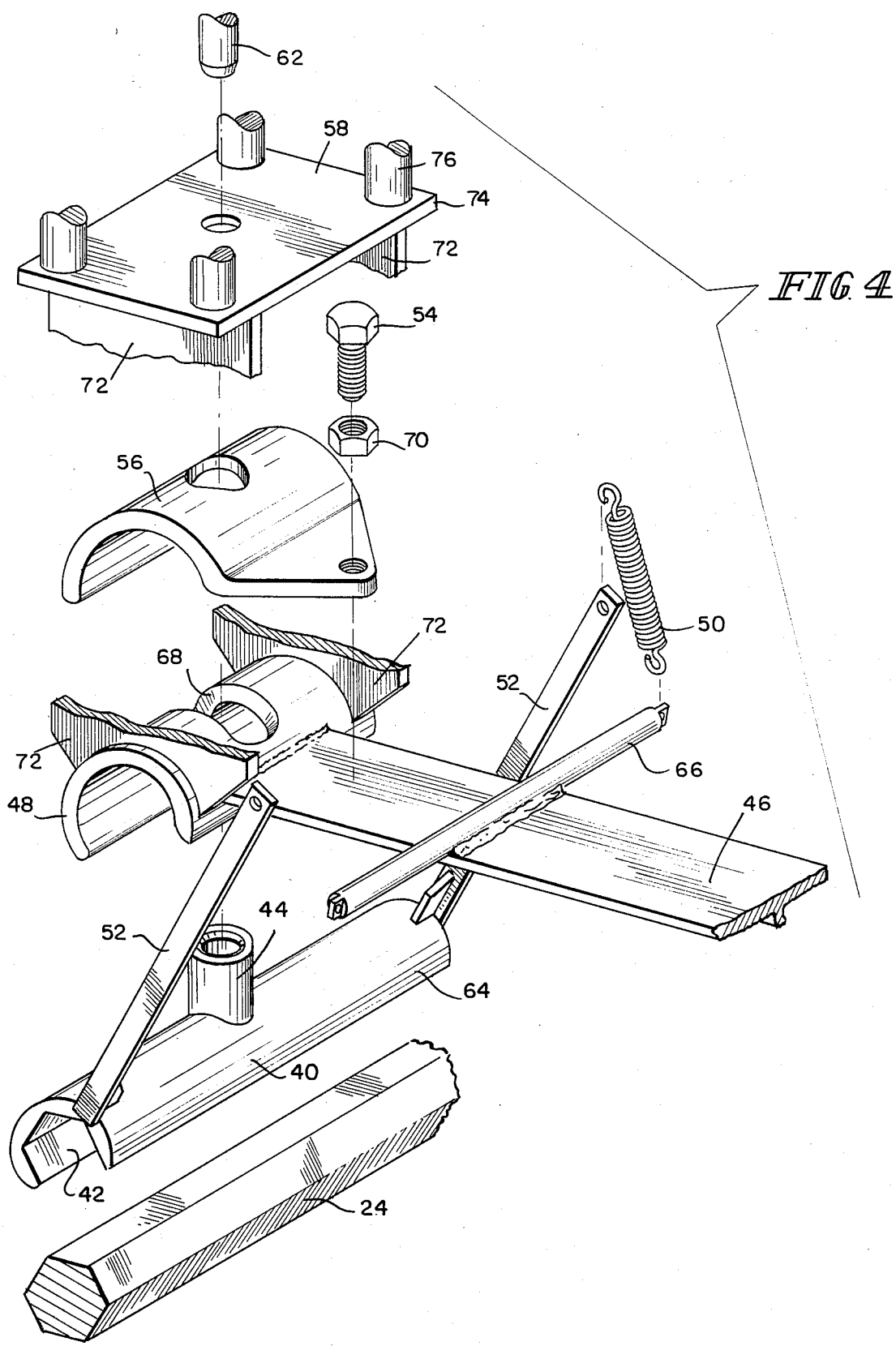
FIG. 4 is an exploded prespective view of the structural elements forming the modified treadle of the present invention.

A conventional press brake assembly 10 is shown in FIG. 1 together with certain modifications in accordance with the present invention. The press brake assembly 10 comprises a frame 12 upon which are mounted a fixed bed 14 and a vertically reciprocal ram 16 which define the work area. A clutch-brake mechanism including a fly wheel generally designated at 18 is mounted within a housing 20 and is driven in a conventional manner by a belt drive from a power source (not shown) typically located behind the press brake assembly 10. The ram 16 is reciprocally driven by eccentric means within the upper portion of the press brake assembly upon actuation of the clutch. The actuation of the clutch is effected by means of a treadle linkage 22 which includes a treadle bar 24 traversing the front of the assembly 10.

A treadle control 26 in accordance with the present invention is mounted on the treadle bar 24 in such a manner that it may be moved to any convenient location along the entire length of the bar 24 by the operator of the press brake assembly. Conduits 28 connect the modified treadle 26 to a fluid source 30, such as a source of compressed air, which is located remote from the work area of the assembly 10. A pair of palm buttons 32 are arranged in spaced relationship to each other and are positioned above the work area. The palm buttons 32 are supported on movable frame 34 which, like the modified treadle 26, can be positioned at any longitudinal location convenient to the operator. The movement of the movable frame 34 is permitted by means of rollers (not shown) mounting the movable frame 34 to fixed framework 36 fixed to the top front of frame 12 of the assembly 10. Appropriate conduits 38 connect the palm buttons 32 to the fluid source 30 in series with the modified treadle 26.

The modified treadle 26 is shown in section in FIGS. 2-4 to comprise a treadle-bar-engaging member 40 having an internal surface 42 formed to match the outside surface of treadle bar 24. The treadle-bar-engaging member 40 includes tubular receiving member 44 which extends upwardly at right angles to the axis of treadle bar 24. A foot pedal 46 has an inner end 48 which surrounds the outer surface of the treadle-bar-engaging member 40 and is movable with respect thereto between the position shown in solid lines and the position shown in phantom in FIG. 2. A biasing spring 50 connected between pedal 46 and extension arm 52 fixed to the treadle-bar-engaging member 40 functions to return the pedal 46 from the phantom position to the solid position shown in FIG. 2. The return movement of the pedal 46 upward by the biasing spring 50 is stopped by adjusting screw 54 which is adjustably fixed into stop member 56 which is in turn fixed to tubular member 44. In this manner, the inner end of pedal 46 is captured for movement between the treadle-bar-engaging member 40 and the stop member 56.

The inner end 48 of pedal 46 is attached to support 58 which carries a motor means such as fluid powered cylinder 60 which is connected to conduits 28. The powered cylinder 60 is preferably operated by compressed air and includes a piston carrying pin 62 which is engagable into tubular member 44 as shown in FIG. 3. When pin 62 is disengaged as shown in FIG. 2, the displacement of pedal 46 downward from the solid line to the phantom position causes the moveable support 58 and powered cylinder 60 to move with the pedal 46 to the phantom position shown in FIG. 2. When pin 62 is disengaged, tubular member 44 which is fixed to the treadle-bar-engaging member 40 does not move, and there is relative displacement between tubular member 44 and pin 62. When pin 62 is engaged into tubular member 44 as shown in FIG. 3, the downward displacement by application of a force to pedal 46 causes rotation of the powered cylinder 60, pin 62, tubular member 44, and treadle-bar-engaging member 40 which inturn causes the treadle bar 24 to be rotated. The rotation of treadle bar 24 causes the remaining treadle linkage 22 to be displaced so as to cause the press brake assembly 10 to operate in the intended fashion.

FIG. 4 shows in more detail the structural relationships of the modified pedal of the present invention. The treadle bar 24 is shown to be hexagonal but other noncircular cross sections have been used. The interior surface 42 of the treadle-bar-engaging member 40 is appropriately configured so as to engage the outer surface of treadle bar 24 in such a manner so as to be able to apply a torque to the treadle bar 24. The outer surface 64 of the treadle-bar-engaging member 40 is a cylindrical segment most desirably arranged coaxially with the axis of treadle bar 24 when engaged thereon. The cylindrical member 44 fixed to the treadle-bar-engaging member can be of any convenient size adapted to cooperate with pin 62 of powered cylinder 60. The extensions 52 extending upwardly and forwardly from the treadle-bar-engaging member 40 anchor one end of the biasing springs 50 while the other end of the biasing springs 50 are engaged onto the ends of biasing bar 66 which is fixed to pedal 46.

The tubular member 44 extends upwardly through a slot 68 on the inner end 48 of pedal 46. The slot 68 extends around the inner end 48 of pedal 46 a distance sufficient to permit the relative displacement of the pedal 46 with respect to the tubular member 44 as shown in FIG. 2. The stop member 56 is welded or otherwise secured to an upper portion of the tubular member 44 in a spaced relationship such that the inner end 48 of pedal 46 can be received between stop member 56 and the outer surface 64 of the treadle-bar-engaging member 40. The set screw 54 is adjustably positioned and secured to stop member 56 by means of a conventional nut 70 in the usual form.

At the lateral extremities of the inner end 48 of pedal 46 are upward extending flanges 72 which together with horizontal plate 74 form support 58. The powered cylinder 60 is mounted to the support 58 by appropriate standoffs 76. Further a cover 78 shown in FIGS. 2 and 3 can be secured by screws or other appropriate means 80 to engaging flanges 72.

The position of pin 62 relative to tubular member 44 is controlled by powered cylinder 60 which is in series with palm buttons 32 and fluid pressure source 30. The powered cylinder is biased such that the pin 62 remains in the retracted position shown in FIG. 2 until such time as the palm buttons 32, or other similar sensors, are triggered signifying that the operator's hands are away from the work area of the assembly 10. The pin 62 is displaced to the position shown in FIG. 3 engaging tubular member 44 only so long as the palm buttons 32 continue to be depressed. In the event that the operator removes either hand from the palm buttons 32, the pin 62 is moved by power cylinder 60 from the position shown in FIG. 3 to the disengaged position shown in FIG. 2 thereby interrupting the mechanical linkage between the pedal 46 and the remaining treadle linkage 22. The biasing force provided by clutch springs within the clutch 18 immediately acts on the treadle linkage 22 to return the treadle bar 24 and treadle-bar-engaging member 40 to the position shown in FIG. 2. This restoring force provided by the clutch springs of clutch 18 is significantly greater than the small restoring force providing by biasing springs 50. The restoring of the treadle bar 24 to its undisplaced position immediately stops any movement of the ram 16 by virtue of the conventional brake assembly within the clutch-brake mechanism 18. The interrupting of the mechanical linkage can be sensed through the foot of the operator thus acting as a reminder of the danger presented by misplacement of the operator's hands.

A switch 82, preferably key operated, can be provided on the fluid source 30 for selecting the number of palm buttons 32 required to be actuated. Thus, when the particular job demands that the operator use one hand to hold the workpiece, a foreman can turn the switch 82 such that only one palm button needs to be actuated. The specific design of switch 82 will be apparent to those skilled in the art.

Although the invention has been described in detail with reference to the preferred embodiment, variations and modifications exist within the scope and spirit of the invention as described and as defined in the following claims:

I claim:

1. A control for a treadle activated machine tool having power means for powering the operation of the tool, a treadle, and mechanical treadle linkage connecting the treadle to the power means for causing actuation of the machine tool upon application of a force to the treadle, the control comprising at least one sensor means for sensing the presence of an operator's hand remote from a work area of the machine tool and interrupt means for selectively interrupting the treadle linkage in response to a signal from the sensor indicating the absence of the operator's hand from the sensor means.

2. The control means of claim 1 comprising a pair of said sensor means spaced sufficiently to prevent simultaneous actuation by one hand or arm, and sensor selector means for selecting the number of sensors required to be actuated to block operation of the interrupt means.

3. The control means of claim 1 comprising a first member and a second member of the treadle linkage displaceable from a rest position, and an engaging means connected to said interrupt means for selectively engaging the first and second members to permit co-displacement of the first and second members upon application of a force to the treadle.

4. The control means of claim 3 wherein the engaging means is mounted on a selected one of the first and second members for movement therewith, the engaging means being engagable with the other member only if the members are undisplaced from said rest position, the engaging means being disengagable by said interrupt means at any position of the first and second members.

5. The control means of claim 4 wherein the interrupt means comprises a powered actuator connected to the engaging means and movable therewith between an engaged and a disengaged position, and means biasing the actuator towards a disengaged position.

6. A treadle for use on a machine tool having a power means for powering the operation of the tool and a treadle bar rotatable from a rest position to an actuation position for causing actuation of the machine tool, the treadle comprising: a first member engagable with the treadle bar for application of a torque thereto, a second member including a foot pedal movable with respect to the first member from a position aligned with the first member to a displaced position upon application of a force to the foot pedal, means for biasing the second member toward the aligned position, and engaging means for selectively engaging the first and second members.

7. The treadle of claim 6 wherein the engaging means comprises a motor means carried by one of the first and second members, and a pin moved by the motor means to engage the other of the first and second members.

8. The treadle of claim 6 wherein the engaging means is engageable only where the second member is in the aligned position with the first member but is disengageable at any position.

9. The treadle of claim 6 wherein the first member includes an inside surface formed to partially surround and engage a treadle bar and a receiving member extending at an angle to the inside surface for receiving the engaging means.

10. The treadle of claim 9 wherein the second member includes a slot through which the receiving member extends, the slot limiting the displacement of the second member with respect to the first member.

11. The treadle of claim 6 wherein the first member further comprises stop means for stopping the second member at said aligned position.

12. The treadle of claim 6 wherein the second member further comprises a support means for supporting said engaging means for displacement with the second member.

* * * * *